May 16, 1950 J. E. PASTORET 2,508,188
GATHERING-REEL MOTOR
Filed Oct. 12, 1948
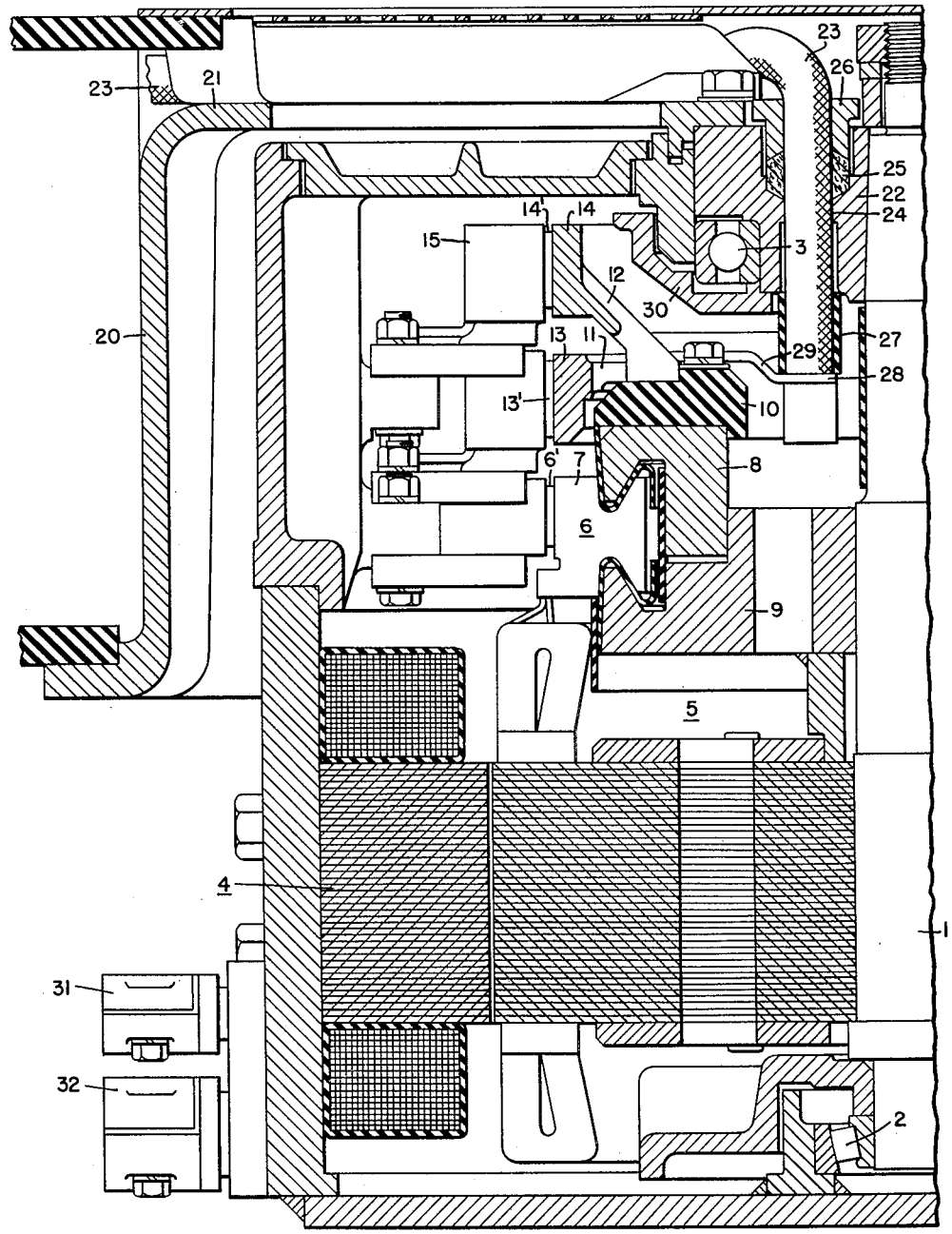
WITNESSES:
Edward Michaels
Thw. C. Groome
INVENTOR
John E. Pastoret.
BY O. B. Buchanan
ATTORNEY Patented May 16, 1950

2,508,188

UNITED STATES PATENT OFFICE 2,508,188

GATHERING-REEL MOTOR

John E. Pastoret, Pittsburgh, Pa., assignor to Westinghouse Electric Corporation, East Pittsburgh, Pa., a corporation of Pennsylvania Application October 12, 1948, Serial No. 54,128

2 Claims. (Cl. 172—36)

My invention relates to gathering-reel motors for mine-locomotives. These are usually vertical-shaft motors which are designed to develop a continuous torque at standstill, and which are provided with an overhanging cable-reel drum which is suspended from the upper end of the shaft, for maintaining a specified amount of tautness in one or more flexible electric cables which supply power to the locomotive as it moves toward and away from the trolley-wire.

My invention has more particular relation to a gathering-reel motor of the type just described, which is shorter in height than any previous design, which gives at least 50% greater torque, which has a collector-ring capacity for handling 80% more current, and which has greater insulation creepage-distances and simpler arrangements of leads and bearing-assemblies than in previous motors of this type.

In order to build such a motor, it has been necessary to develop a special collector-ring mounting in which the collector-ring or rings are mounted on an annular insulating member which is mounted on the front end of the front supporting V-ring of the commutator.

The object of my invention is to provide an improved motor and an improved collector-ring mounting of the type just described.

An exemplary form of embodiment of my invention is shown in the accompanying drawing, the single figure of which is a cross sectional view of the left half of my motor.

As shown on the right side of the drawing, my gathering-reel motor is provided with a vertical shaft 1 which is supported by a lower or rear-end bearing 2 and an upper or front-end bearing 3, these bearings being carried by the respective ends of a stator-member 4. The motor also has a rotor-member 5 which is carried by the shaft 1 and which includes a cylindrical commutator-member 6, the commutator-end of the rotor-member 5 being called the front end of the same, and being also the top end of the rotor-member. The cylindrical commutator-member 6 comprises commutator-bars 7 and front and rear supporting V-rings 8 and 9, which may be of conventional construction.

In accordance with my invention, the front end of the front V-ring 8 has secured thereto an annular insulating member 10, which is used to support the supporting-brackets 11 and 12 of two collector-rings 13 and 14. Brushes 6', 13' and 14' bear on the cylindrical commutator-member 6 and on said collector-rings 13 and 14, respectively, said brushes being carried by suitable brushgear 15.

The gathering-reel motor is also provided with a cable-reel drum 20, which surrounds the frame-member 4 and which is supported, at its upper end, by a disc or spider-member 21 which is supported from a hub 22 which is mounted on the upper or front end of the shaft 1, said hub 22 being disposed inside of the upper or front-end bearings 3. The cable-reel drum 20 has one or more cables 23 (in the illustrated motor there are two cables), which are wound on the drum, and the inner ends of the cables extend through suitable holes 24 in the hub 22, so as to enter into the interior of the motor. The portion of each cable 23, where it passes through the hole 24 in the hub 22, is locked in place by a suitable asbestos packing or gland 25, and a gland-nut 26. The inner end of each cable 23, inside of the motor, is surrounded by an insulating tube 27, and the extreme inner end is secured, as shown at 28, to a bracket 29 which makes electrical connection to one of the collector-ring spiders 11 or 12, as the case may be.

As a result of the foregoing construction, it will be noted that the annular insulating member 10 surrounds or overhangs the inner ends of the cables 23, while the inner or lower collector-ring 13 is radially larger than both the annular insulating member 10 and the extreme front end of the commutator V-ring 8, and is so disposed that it surrounds or overhangs these parts, while the upper collector-ring 14 similarly overhangs the upper bearing 3, thus reducing the vertical height of the motor to a minimum. At the same time, the annular insulating member 10 completely covers the front V-ring 8 of the commutator, thus providing a long insulation creepage-distance between the circumferentially displaced mounting-points of the collector-ring brackets 11 and 12 respectively, and between these brackets and the grounded portions of the motor; while the insulating tube 27 provides ample creepage-distances between the electric connection-brackets 29 and the grounded upper bearing-cup 30 and hub-member 22 of the motor. Since the space occupied by the insulating sleeve 27 extends underneath the annular insulating member 10, with some of the space underneath the front V-ring 8 also available, it is quite feasible to make the length of this insulating sleeve 27 have whatever value may be necessary for providing the desired insulating strength. The greater space which is made available by the particular positioning of the two collector-rings 13 and 14 makes possible the use of adequate axial length for these rings, so as to provide adequate current-collecting capacity.

In operation, power is fed to the locomotive through the cable or cables 23, from which the current is collected by means of the brushes 13' and 14', and fed, not only to the gathering-reel motor itself, but also, through cable-connections 31 and 32, to other electrical apparatus on the locomotive.

I claim as my invention:

1. A dynamo-electric machine having a rotor-member having a cylindrical commutator-member, said commutator-member comprising commutator-bars and front and rear supporting V-rings, characterized by an annular insulating member secured to, and completely covering, the front end of the front V-ring, one or more collector-rings supported on said annular insulating member, one of said collector-rings being radially larger than both the annular insulating member and the extreme front end of the front supporting V-ring, and being so disposed that it surrounds or overhangs these parts, and brushes bearing on said cylindrical commutator-member and on said collector-ring or rings, respectively.

2. A gathering-reel motor comprising a stator-member, a rotor-member, said stator-member having end-members carrying bearings, a shaft for the rotor-member carried by said bearings and having its front end extending beyond the front end of the stator-member, the front end of the shaft having a hub-member thereon, disposed inside of the bearing at the front end of the stator-member, a cable-reel drum disposed outside of the stator-member and supported at its front end from said hub-member, said drum having one or more insulated cables extending through said hub-member into the interior of the motor, said rotor-member having a cylindrical commutator-member, said commutator-member comprising commutator-bars and front and rear supporting V-rings, characterized by an annular insulating member secured to, and completely covering, the front end of the front V-ring, said insulated cable or cables extending underneath the annular insulating member, one or more collector-rings supported on said annular insulating member, one of said collector-rings being radially larger than both the annular insulating member and the extreme front end of the front supporting V-ring, and being so disposed that it surrounds or overhangs these parts, an electrical connection or connections between said cable or cables and said collector-ring or rings, respectively, and brushes bearing on said cylindrical commutator-member and on said collector-ring or rings, respectively.

JOHN E. PASTORET.

REFERENCES CITED

The following references are of record in the file of this patent:

UNITED STATES PATENTS

| Number | Name | Date |
|---|---|---|
| 547,683 | Rowland | Oct. 8, 1895 |
| 758,635 | Foot | May 3, 1904 |
| 2,256,870 | Schaffer | Sept. 23, 1941 |